(12) United States Patent
Yamane et al.

(10) Patent No.: US 7,578,559 B2
(45) Date of Patent: Aug. 25, 2009

(54) RETRACTABLE VEHICLE HEADREST

(75) Inventors: Takeshi Yamane, Okayama (JP);
Tokuzo Kobayashi, Okayama (JP);
Akihiko Okamoto, Okayama (JP)

(73) Assignee: Bizen Hatsujoh Co., Ltd., Okayama (JP)

( * ) Notice: Subject to any disclaimer, the term of this patent is extended or adjusted under 35 U.S.C. 154(b) by 0 days.

(21) Appl. No.: 12/218,642

(22) Filed: Jul. 17, 2008

(65) Prior Publication Data
US 2009/0021068 A1   Jan. 22, 2009

(30) Foreign Application Priority Data
Jul. 19, 2007   (JP) .............................. 2007-187719

(51) Int. Cl.
*A47C 7/36* (2006.01)

(52) U.S. Cl. ..................................... 297/408

(58) Field of Classification Search ................. 297/408, 297/391, 403, 409
See application file for complete search history.

(56) References Cited

U.S. PATENT DOCUMENTS

| | | | |
|---|---|---|---|
| 5,669,668 A * | 9/1997 | Leuchtmann | 297/408 |
| 6,129,421 A * | 10/2000 | Gilson et al. | 297/408 |
| 6,299,254 B1 * | 10/2001 | Dinh et al. | 297/408 |
| 7,341,312 B2 * | 3/2008 | Gauthier et al. | 297/408 |
| 2005/0088027 A1 * | 4/2005 | Yetukuri et al. | 297/408 |
| 2007/0164593 A1 * | 7/2007 | Brockman | 297/408 |

FOREIGN PATENT DOCUMENTS

| | | |
|---|---|---|
| JP | S62-11453 | 7/1987 |
| JP | H4-005918 | 1/1992 |
| JP | H11-011199 | 1/1999 |
| JP | 2000-052825 | 2/2000 |
| JP | 2001-046170 | 2/2001 |

* cited by examiner

*Primary Examiner*—Milton Nelson, Jr.
(74) *Attorney, Agent, or Firm*—William L. Androlia; H. Henry Koda

(57) ABSTRACT

A headrest including a base material having a front base member and a rear base member, a turn restricting bracket installed the front and rear base members and having an abutting portion and a protruding step, a center shaft attached to the turn restricting bracket, and a latching panel installed between the front and rear base members with one end thereof hinged to the rear base member, the latching panel being pulled by a spring. The headrest has forward and rearward use limitation positions: at forward use limitation position, when the headrest turns forward and a latching surface formed in the latching panel catches on the protruding step, a further forward turning of the headrest is restricted; and at the rearward use limitation position, when the headrest turns rearward and the abutting portion strikes the front base member, further rearward turning of the headrest is restricted.

8 Claims, 16 Drawing Sheets

DIFFERENCE IN PUSH-IN AMOUNT OF CENTER SHAFT

RETRACTABLE VEHICLE HEADREST

BACKGROUND OF THE INVENTION

1. Field of the Invention

This invention relates to a headrest attached to a seat back of a vehicle seat and more particularly to a seat back of a front passenger seat or rear seat of a vehicle.

2. Description of the Related Art

Vehicle seats which are designed so that they fold up in the interest of convenience as when loading baggage or other goods into the vehicle have been known. When loading baggage or other goods, the headrest sometimes constitutes a hindrance; accordingly, if the headrest is can be turned down forward and retracted, adequate folding up of the seats will become possible. When no passenger is seated, if the headrest is retracted, the visibility of the driver will not be hindered. For such reasons as noted above, in Japanese Patent Application Laid-Open No. 2001-46170, the headrests are retracted in such a condition that they are folded up into a retracted position near the seat back. However, play in the turning parts becomes problematic, and this play results from deformation and/or wear in guide members and/or position restricting members; and when such play occurs, the sense of the head fitting is impaired, the person seated feel uncomfortable, and, in some cases, the play can even become dangerous.

BRIEF SUMMARY OF THE INVENTION

The object of the present invention is to provide a headrest in which play in the mechanical structure is eliminated, switching between a use position and a retracted position is of course possible, and the fore-and-aft angle in the use position is adjustable, so that the head of a passenger(s) (person(s) who is seated) can fit better in conjunction with the physique of the passenger.

The above object is accomplished by a unique structure of the present invention for a headrest that is provided on a seat back and turns between an erect use position and a retracted position toppled forward; and in the present invention, the headrest comprises:
- a base material formed by a front base member and a rear base member,
- a turn restricting bracket provided between the front and rear base members and formed with an abutting portion and a protruding step,
- a center shaft attached laterally or horizontally to the turn restricting bracket, and
- a latching panel provided between the front and rear base members with one end thereof hinged to the rear base member, the latching panel being urged toward the rear base member by being pulled by a spring provided between the latching panel and the base member or by being pushed by a spring provided between the latching panel and the front base member; and the headrest is provided with
- a forward use limitation position where, when the headrest turns forward about the center shaft and a latching surface formed in the latching panel catches on the protruding step of the turn restricting bracket, further forward turning of the headrest is restricted, and
- a rearward use limitation position where, when the headrest turns rearward and the abutting portion of turn restricting bracket strikes the front base member, further rearward turning of the headrest is restricted; and a control knob is provided through the rear base member such that, when the latching surface of the latching panel is released from the protruding step of the turn restricting bracket by manipulation of the control knob, the headrest is able to turn further forward to the retracted position.

In the above-described structure of the headrest of the present invention, a coil spring, in which an inner diameter thereof is smaller than the outer diameter of the center shaft and one end thereof is linked to the base member, is further provided. This coil spring is wound on the center shaft, thus increasing resistance to the turning of the base member and allowing the position of the headrest to be secured, against a load, even between the forward use limitation position and rearward use limitation position.

Furthermore, the spring-mounted center shaft has two different diameter portions, a larger diameter portion and a smaller diameter portion.

In addition, a coil spring linking part for the base member is provided in the latching panel, so that, when the control knob is manipulated so as to release the latching surface of the latching panel from the protruding step of the turn restricting bracket, the coil spring linking part loosens the coil spring.

Furthermore, in the present invention, the protruding step of the turn restricting bracket is formed such that its center shaft side is formed as a higher inclined surface, the latching surface of the latching panel is formed round when viewed from the side, and the latching surface is pressed against the protruding step without play by the action of the coil spring provided on the center shaft.

In the present invention, each one of the front and rear base members is a steel plate press-machined member bent at its upper part around with a prescribed rounding so that the cross-section is substantially hook-shaped, and each base member is recessed at a middle portion thereof.

Also, a plastic cover is fitted on from the rear base member to the lower part of the front base member, the base members and the plastic cover are covered by a surface skin made in a form of a bag, and urethane is injected therebetween and caused to foam.

In addition, the control knob is provided either on the back or on the side of the headrest.

According to the headrest of the present invention as described above, limitation positions of the use position in which the forward turning and the rearward turning of the headrest are restricted is provided. In the forward use limitation position, the latching panel is firmly latched because it is in a condition in which, by the action of the spring, the latching surface thereof is pressed against the protruding step of the turn restricting bracket; and in the rearward use limitation position, in view of the fact that the abutting portion of the turn restricting bracket is abutting the entire surface of the base member, the latching panel is firmly secured. In addition, since switching of the headrest between the use position and retracted position can be done merely by manipulation of the control knob and tilting of the headrest, the switching operation is simple.

Furthermore, in the structure of the present invention, the turning resistance of the base member increases and play can be absorbed, and such a use position of the headrest that the headrest is secured, against a load, in any use position between the rearward use limitation position and forward use limitation position and fine angular adjustments is possible and the headrest fits better to the head of a passenger cam be obtained. Furthermore, the turning resistance described above, that is, the base member securing force, can be adjusted; and it is possible to make angular adjustments with a light force even when the securing force is made even stronger. In addition, in the structure of the present invention, play absorption can be even more definitely done; and since there is no need to cover the rounded portion of the base member with a plastic cover, material savings can be realized. Furthermore, the manufacturing cost is low, and the headrest has good adjustment maneuverability.

BRIEF DESCRIPTION OF THE SEVERAL VIEWS OF THE DRAWINGS

FIGS. 2B-1 and 2B-2 show the relationship between the smaller and larger diameter portions of the center shaft used in the headrest of the present invention;

DETAILED DESCRIPTION OF THE INVENTION

Figure 1:
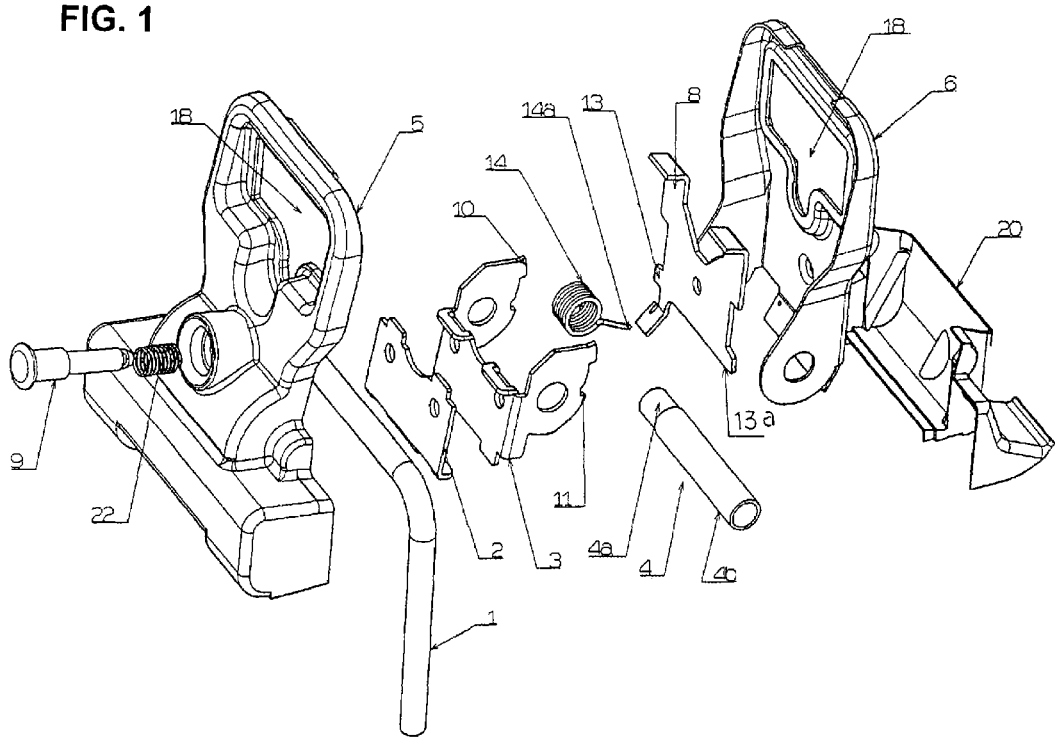
FIG. 1 is an exploded perspective view of a headrest according to the present invention.

The present invention will be now described below on the embodiments with reference to the accompanying drawings, in which FIG. 1 is an exploded view of the headrest of the present invention and FIGS. 2A to 5 are side views of the main portion of the headrest.

Figure 2A:
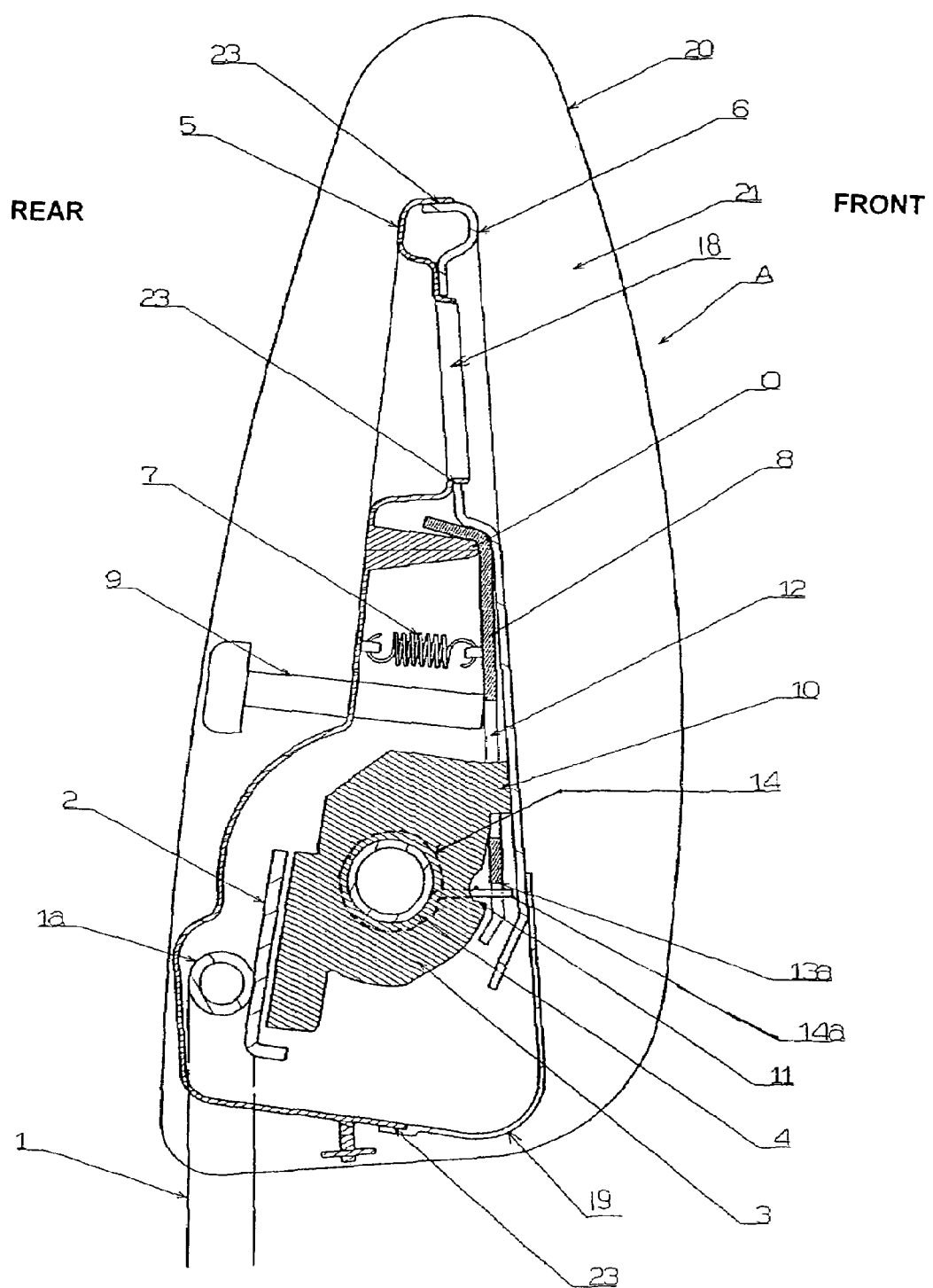
FIG. 2A is a side view of the main portion of the headrest in its rearward use limitation position.

The headrest A (see FIG. 2A) comprises an inverted U-shaped stay 1 that is inserted into the seat back (not shown in the drawings) of a vehicle from above, a turn restricting bracket 3 secured to the stay 1 with an attachment plate 2 that is secured to the lateral part 1a of the stay 1 in between, a center shaft 4 laterally (or horizontally) attached to the turn restricting bracket 3, a latching panel 8 that is, with the upper end thereof set in a hinge, suspended downward by a front base member 6 which is a base material of the headrest A, and a control knob 9 provided so as to be able to slide in a plastic cover (rear base member) 5 and capable of moving the latching panel 8 forward (toward the right side on the drawing sheet for FIG. 2A). In this structure, the latching panel 8 is consistently pulled rearward (toward the rear base member 5 or the left side on the drawing sheet for FIG. 2A) by a spring 7 that is tensioned between itself, i.e. the latching panel 8, and the plastic cover (rear base member) 5 that is fit to the rear (inner) surface of the front base member 6. Instead of this spring 7 provided between the latching panel 8 and the rear base member 5, a pushing spring (a compression coil spring) can be provided between the latching panel 8 and the front base member 6 so that the spring consistently pushes the latching panel 8 rearward or toward the rear base member 5.

In the above-described structure, the turn restricting bracket 3 is formed by left and right panels having the same shape; and in the upper portion of the front surface of each one of the panes is formed an abutting portion 10 that protrudes forward. In addition, the left and right panes of the turn restricting bracket 3 is further formed with protruding steps 11 which extend downward and slightly set back from the lower ends of the abutting portions 10 and protrude forward formed in the lower ends of the panels.

The latching panel 8 is a single-piece panel that can swing forwards and backwards with the hinge of its upper part about a fulcrum O, and it has cutouts 12 formed in the two lateral surfaces corresponding to the positions of the abutting portions 10 of the turn restricting bracket 3, so that the abutting portions 10 pass through the cutouts 12. As best seen from FIG. 1, the lower ends of the cutouts 12 protrude in the lateral direction, thus forming latches 13.

In the above-described structure thus formed, the abutting portions 10 of the turn restricting bracket 3 are sufficiently separated from the center axis of the center shaft 4 and have sufficient length.

In the structure described above, when as seen from FIG. 3 the headrest A is erected and the abutting portions 10 of the turn restricting bracket 3 are abutting the front base member 6, the headrest A will not turn further to the rear. This position of the headrest A is the rearward use limitation position. From this condition, the headrest A can turn forward; however, the relationship between the fulcrum O of the latching panel 8 and the center of the center shaft 4 that is the center of turning of the headrest A is set as in FIG. 2A; as a result, when the headrest A is turned forward, as seen from FIG. 3, the lower surfaces of the latches 13 (such lower surface(s) is called a latching surface(s) 13a) come up against the upper surfaces of the protruding steps 11 of the turn restricting bracket 3, and thus the headrest A will not turn further to the forward. This position of the headrest A is the forward use limitation position.

The headrest A of the present invention has, at the rearward use limitation position and forward use limitation position, sufficient restrictive force to loads from the forward and rearward. More specifically, rearward load is generally applied by the head of the passenger to the headrest A; however, in cases where such load is strong, as with the reaction from a sudden start or the like of the vehicle, the headrest A turns as far as the rearward use limitation position and takes that load. On the other hand, the headrest A turns as far as the forward use limitation position when a forward load is applied due to the reaction from an impact or emergency braking of the vehicle or due to a passenger or the like leaning forward thereon from a rear seat; however, the headrest A takes such load with further forward turning being prevented. Nevertheless, the feature of the headrest A of the present invention is that it can take a desired use position at any angle (or it can take any desired inclined position or it can take its use position at any desired inclined angle) between the rearward use limitation position and forward use limitation position.

Figures 1, 2B:
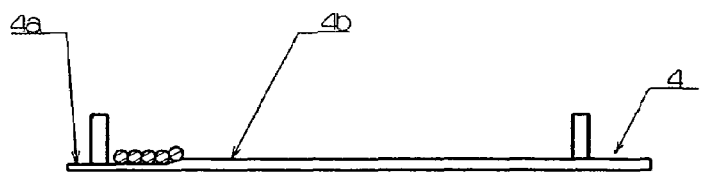
Figures 2, 2B:
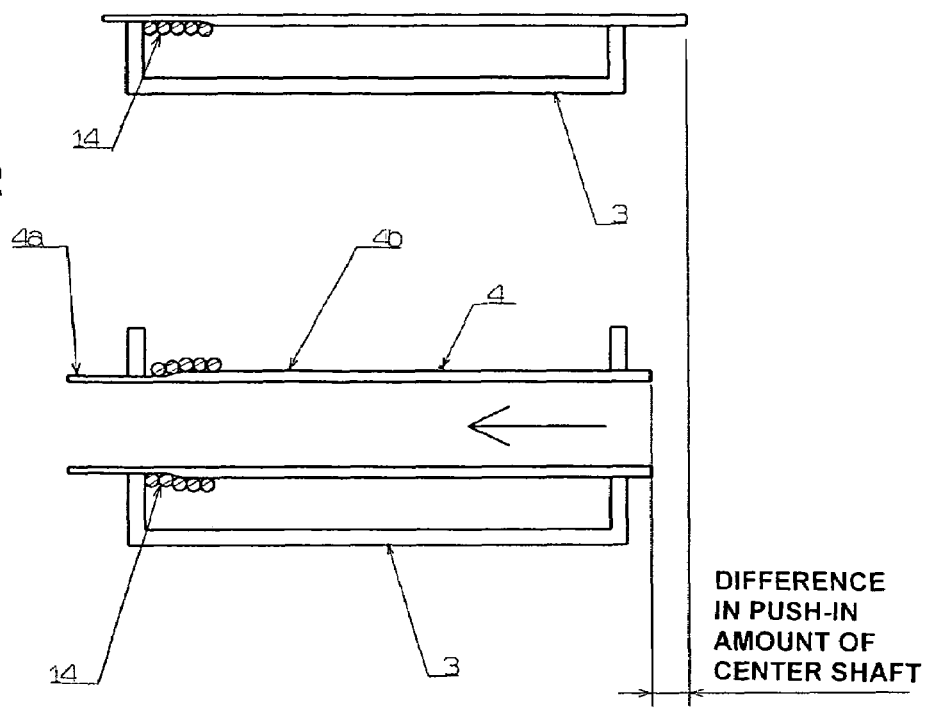
Figure 3:
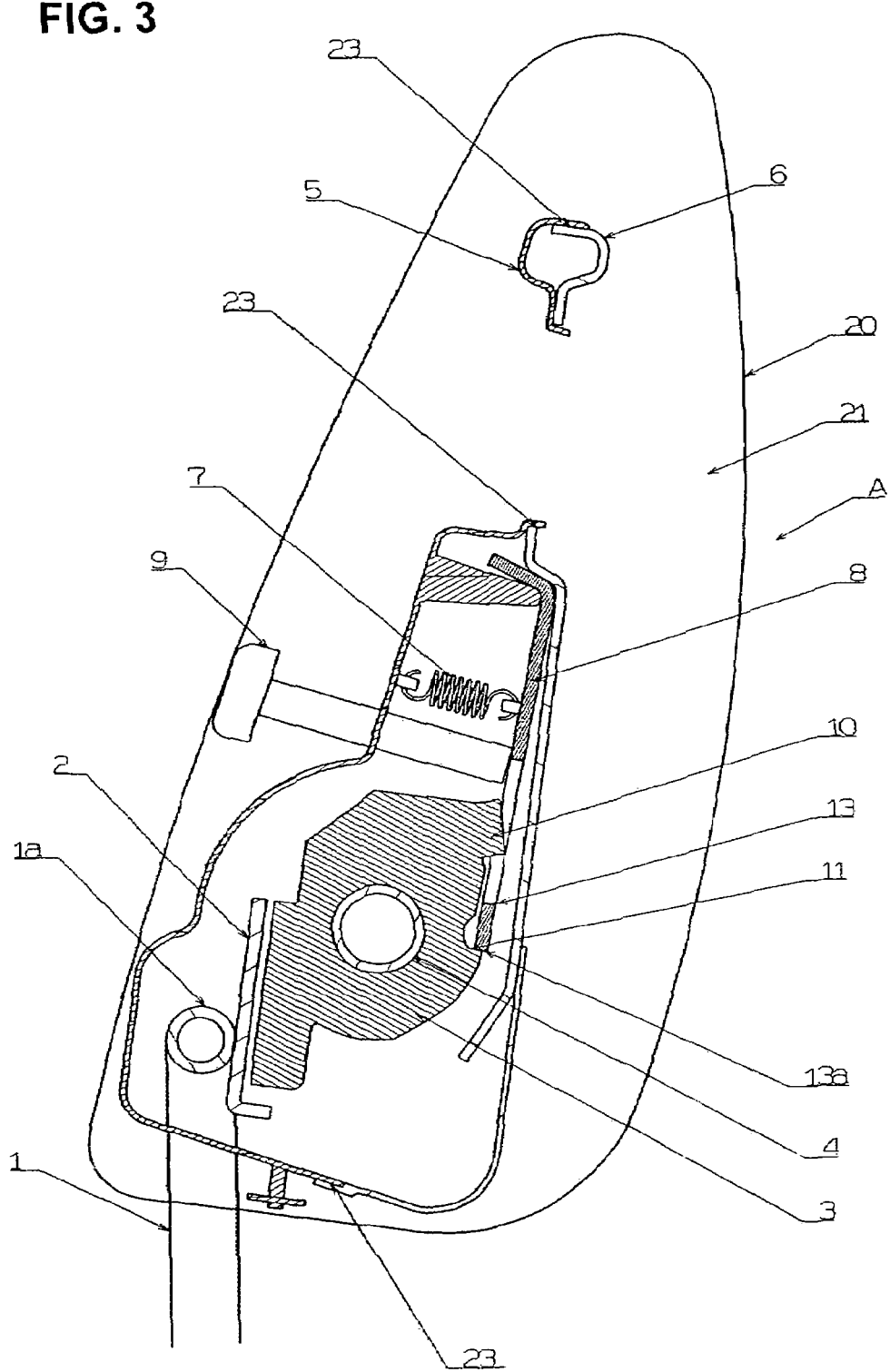
FIG. 3 is a side view of the main portion of the headrest in its forward use limitation position.

In order to realize this function of the headrest A, in the present invention, a coil spring 14 is provided (or wound) on the center shaft 4. More specifically, the center shaft 4 is a stepped shaft of different diameters, as seen from FIG. 1, having a smaller diameter portion 4a and an ordinary portion (or a larger diameter portion) 4b, and the coil spring 14 is wound on this shaft 4 across the smaller diameter portion 4a and the larger diameter portion 4b, with at least one end of the coil spring 14 linked to the latching panel 8. The inner coil diameter of the coil spring 14 is set so as to be slightly smaller than the outer diameter of the larger diameter portion 4b; as a result, the coil spring 14 is wound in a slightly tightened condition on the center shaft 4. With this setting, a resistance to the turning of the headrest A will develop, and the rearward load resulting from the head of a passenger can be sufficiently opposed. In addition, play in the headrest A resulting from deformation or wear in the latching surfaces 13a of the latching panel 8 and protruding steps 11 of the turn restricting bracket 3 can be eliminated. Furthermore, the resistance to turning here of the headrest A can be adjusted by using different center shafts having different ratio between the length of the smaller diameter portion 4a and the length of the larger diameter portion 4b that are defined as an effective winding part for the coil spring 14. In addition, the resistance to turning of the headrest A can be adjusted by changing the position of the center shaft 4 with respect to the bracket 3 by way of pushing in or out of the center shaft, so that the length ratio between the smaller diameter portion 4a and the larger diameter portion 4b varies inside the bracket 3. FIGS. 2B-1 and 2B-2 show the difference of the center shaft 4 pushed into the bracket 3 so that its length ratio between the smaller diameter portion 4a and the larger diameter portion 4b is varied. When the center shaft 4 is pushed in as shown in FIG. 2B-2 so that most of the coil spring 14 is on the larger diameter portion 4b of the center shaft 4, the resistance of turning of the headrest A is larger compared to the situation shown in FIG. 2B-1 in which most of the coil sprig is on the smaller diameter portion 4a.

Figure 7:
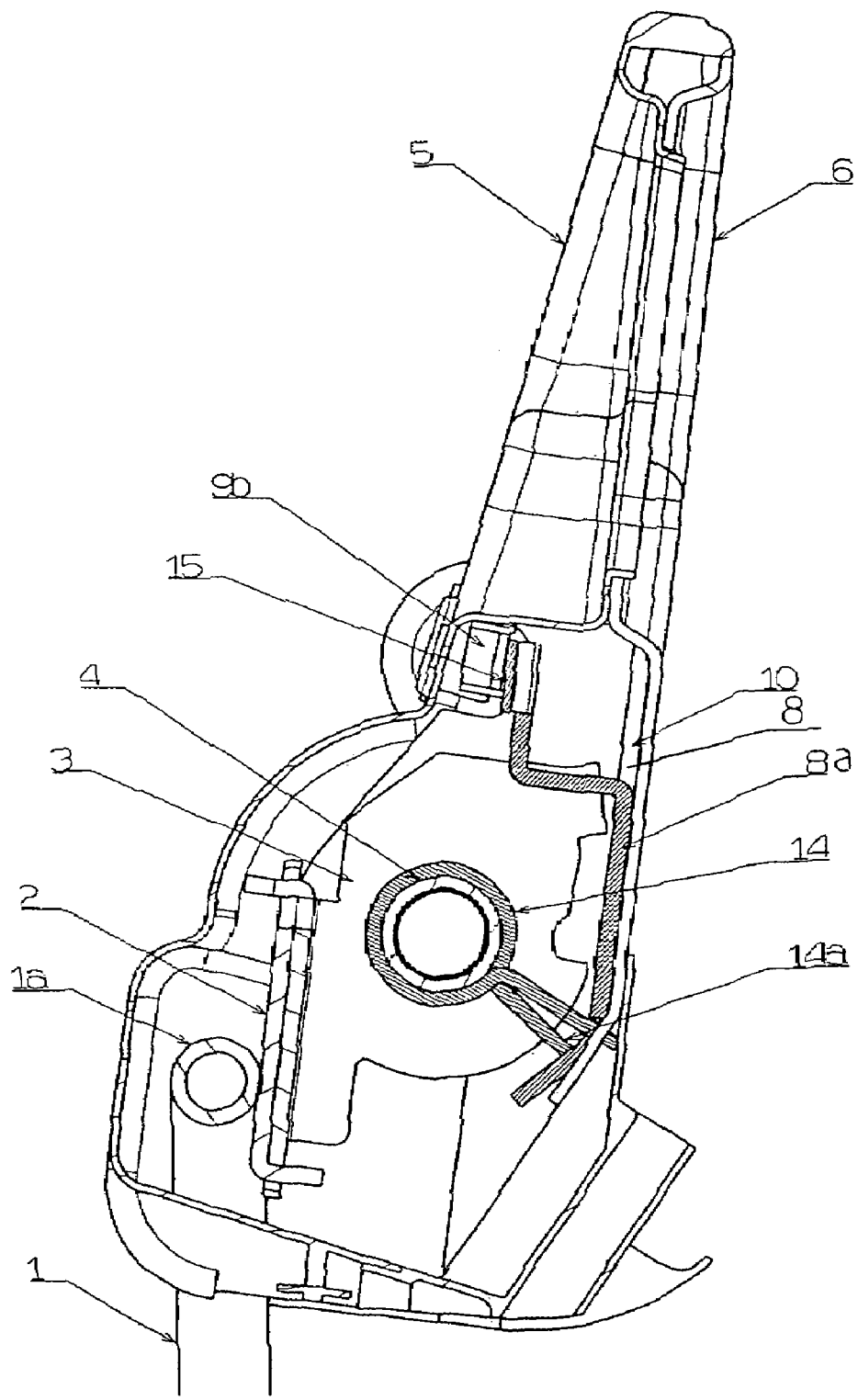
FIGS. 7 and 8 are side views of the main portion of the headrest showing the relationship between the control knob and coil spring.
Figure 8:
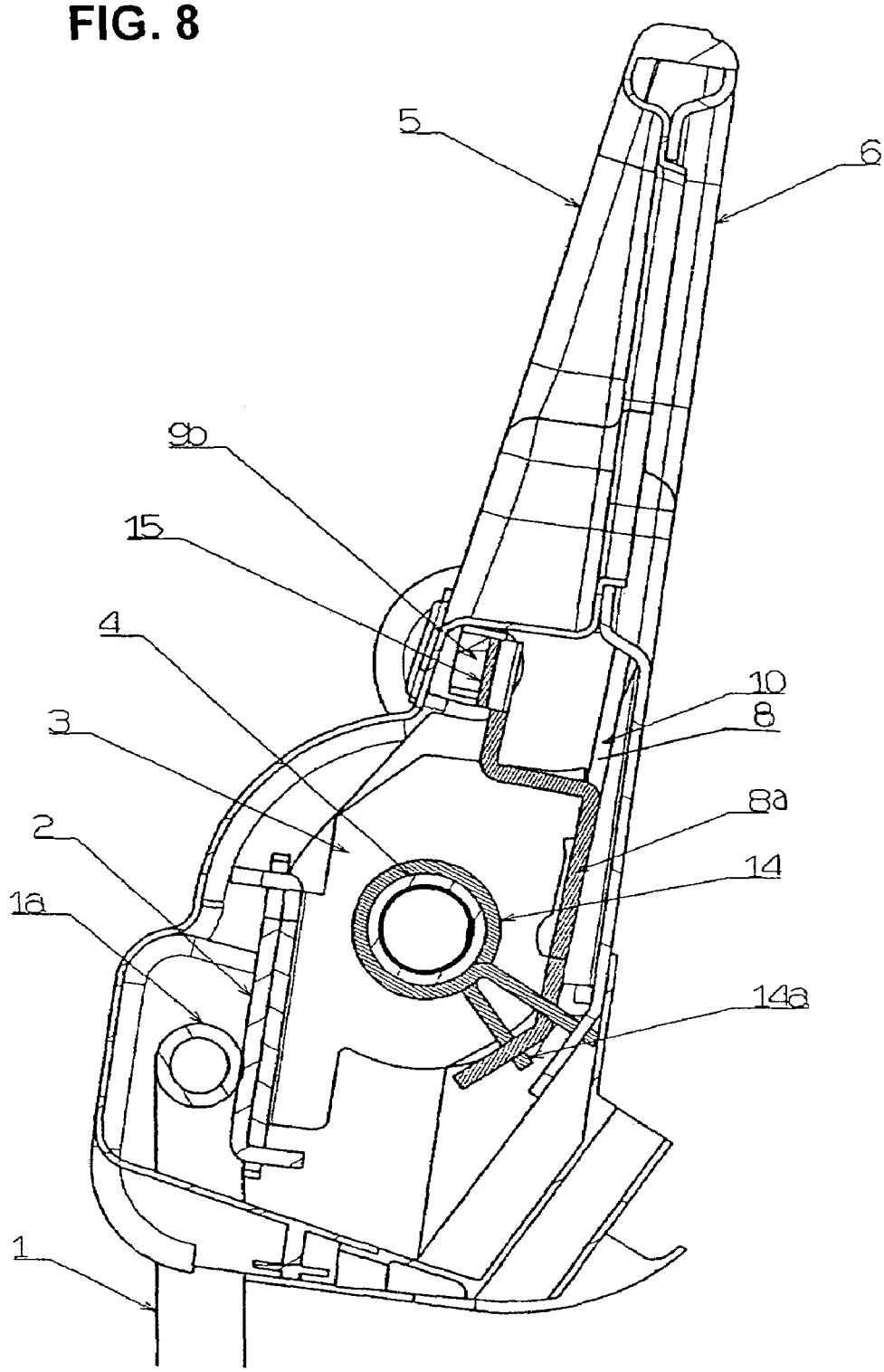

However, if the coil spring 14 is tightened excessively, the turning of the headrest A will become heavy during adjustment. Accordingly, it is possible to have the tightening of the spring 14 loosened only during adjustment. FIGS. 7 and 8 are side views showing this; and they show that such a relationship is made that when the latching panel 8 is separated from the turn restricting bracket 3 by the linking part 14a of the coil spring 14 of the latching panel 8, the coil spring 14 is loosened, so that, when the control knob 9 is pushed in and the latching surface 13a of the latching panel 8 is pulled away from the protruding steps 11 of the turn restricting bracket 3 (in other words, when trying to adjust the angle of the headrest A), the coil spring 14 is loosened (see FIG. 7); and when that is not the case (or when the adjustment of the angle of the headrest is done), the spring is tightened (FIG. 8).

Figure 6:
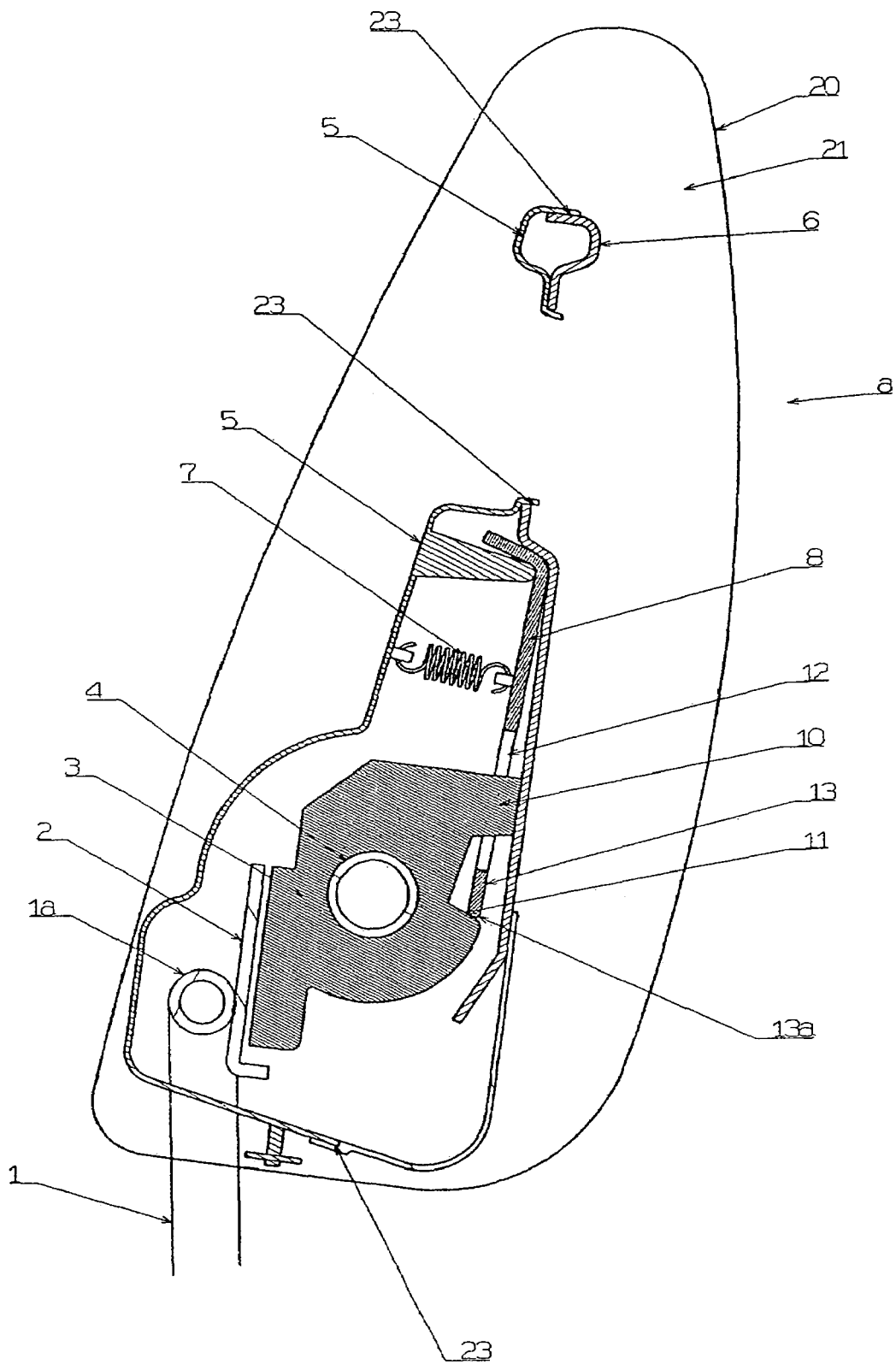
FIG. 6 is a side view of the main portion of the headrest in which the upper surfaces of the protruding steps of the turn restricting bracket are made to incline higher.

Furthermore, rearward and forward loads repeatedly act on the headrest A due to the head of a passenger leaning against it and due to angular adjustments and the like; and as a result, deformation and wear would occur in the latching surface 13a of the latching panel 8 and protruding step 11 of the turn restricting bracket 3, which sometimes cause play to develop in the contacting surfaces thereof. This play impairs the feeling of the head fitting and makes the passenger feel uncomfortable, and thus such play must by all means be eliminated. One measure to achieve that is to make both the latching surface 13a and the protruding step 11 to be left-right pairs to reduce the load applied on each and also to make the abutting portion 10 of the turn restricting bracket 3 sufficiently long, thus enhancing the rigidity thereof; but, in addition, in the present invention, a configuration such as the following is adopted. As seen from FIG. 6, the upper surfaces of the protruding steps 11 of the turn restricting bracket 3 are made to incline higher to the rear (toward the center shaft 4), and the latching panel 8 is pulled by the spring 7, so that the latching surfaces 13a of the latching panel 8 always bite into the higher surface side of the protruding steps 11. Also, by machining the latching surfaces 13a of the latching panel 8 is formed round when viewed from the side, the latching surfaces 13a will able to slide more easily on the protruding steps 11 of the turn restricting bracket 3, which will contribute to absorbing play, to such an extent as that the coil spring 14 may be omitted.

Figure 4:
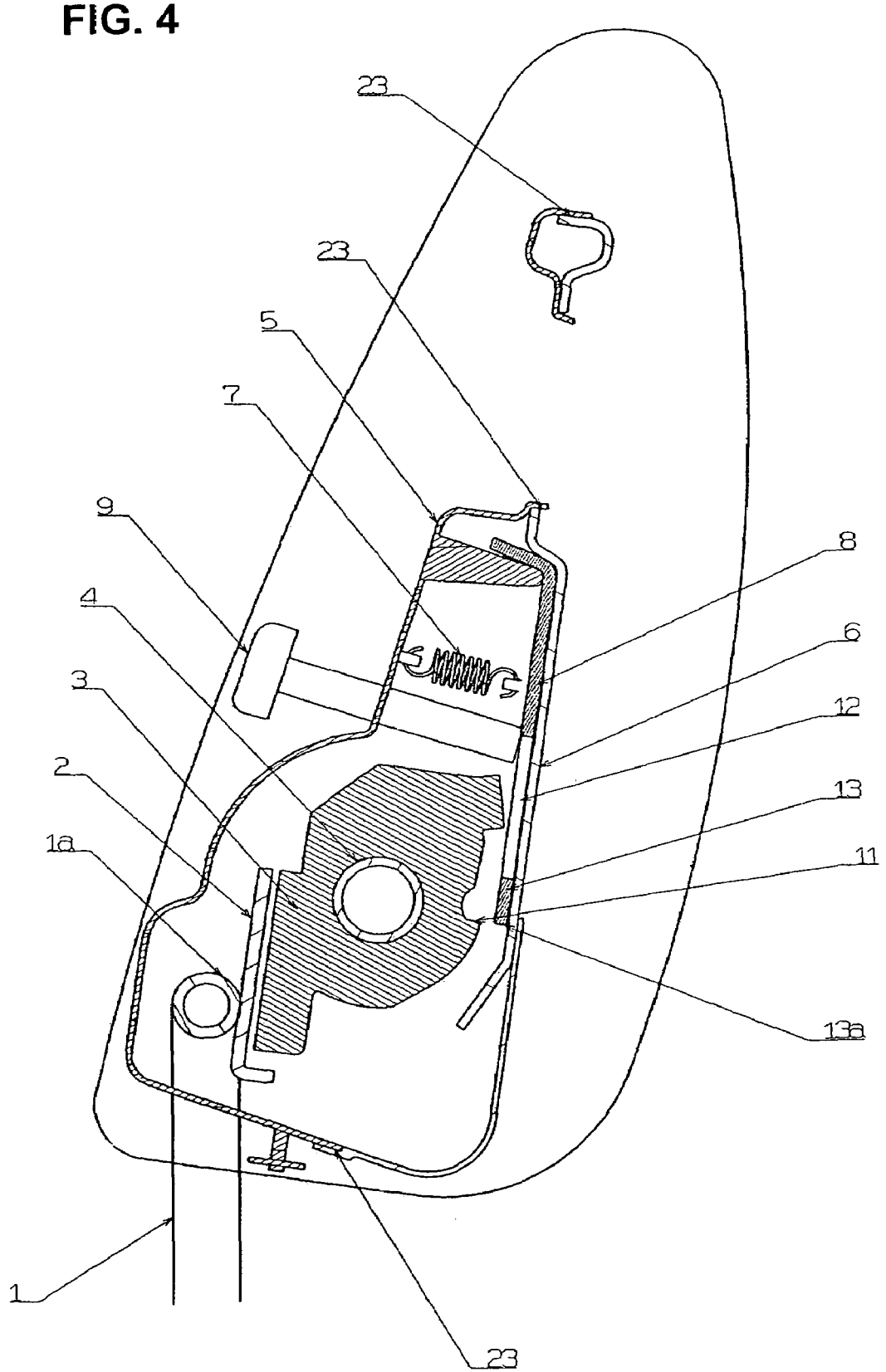
FIG. 4 is a side view of the main portion of the headrest, showing the control knob pressed in forward, separating the latching panel from the turn restricting bracket.
Figure 5:
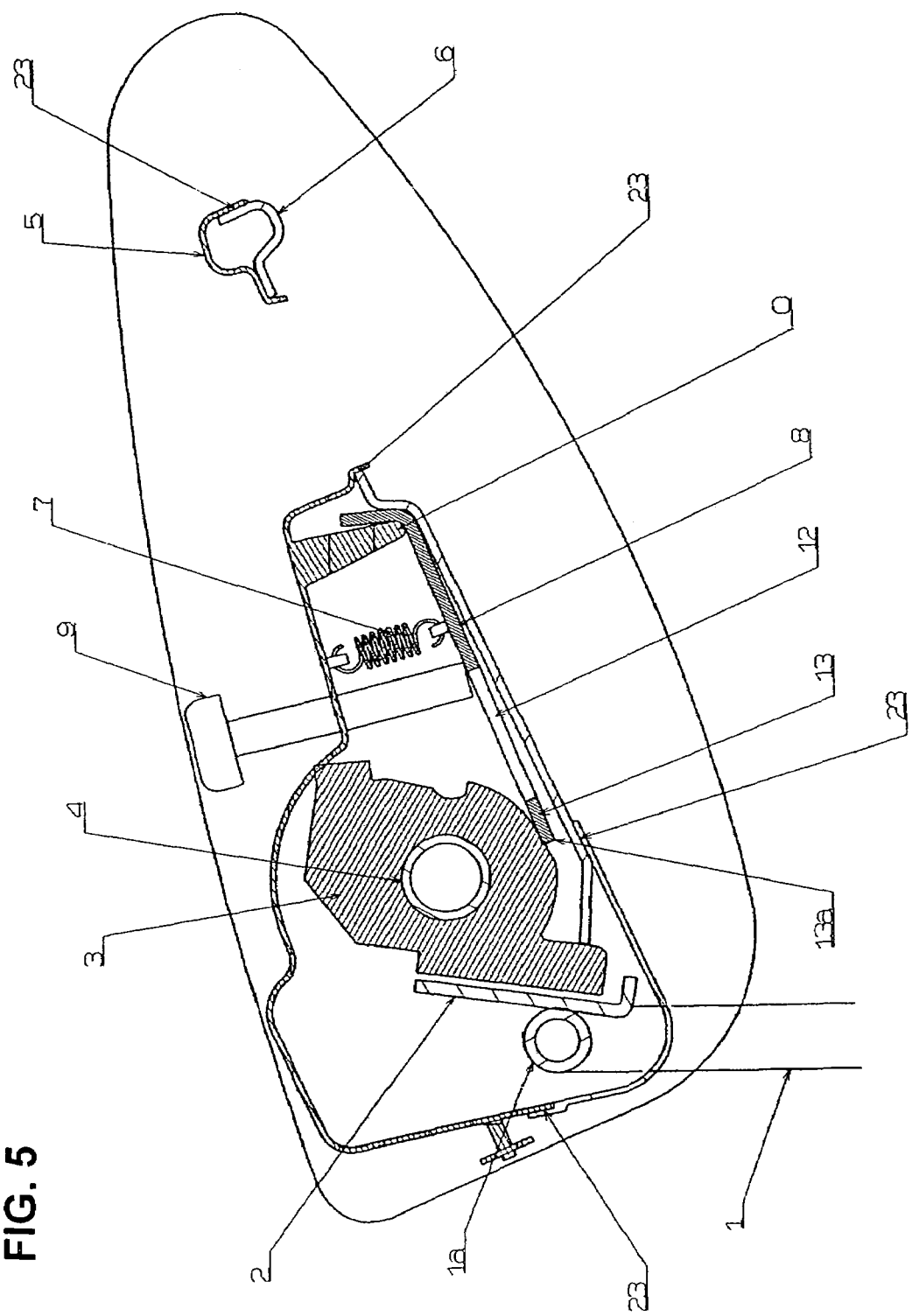
FIG. 5 is a side view of the main portion of the headrest in its retracted position.
Figure 9:
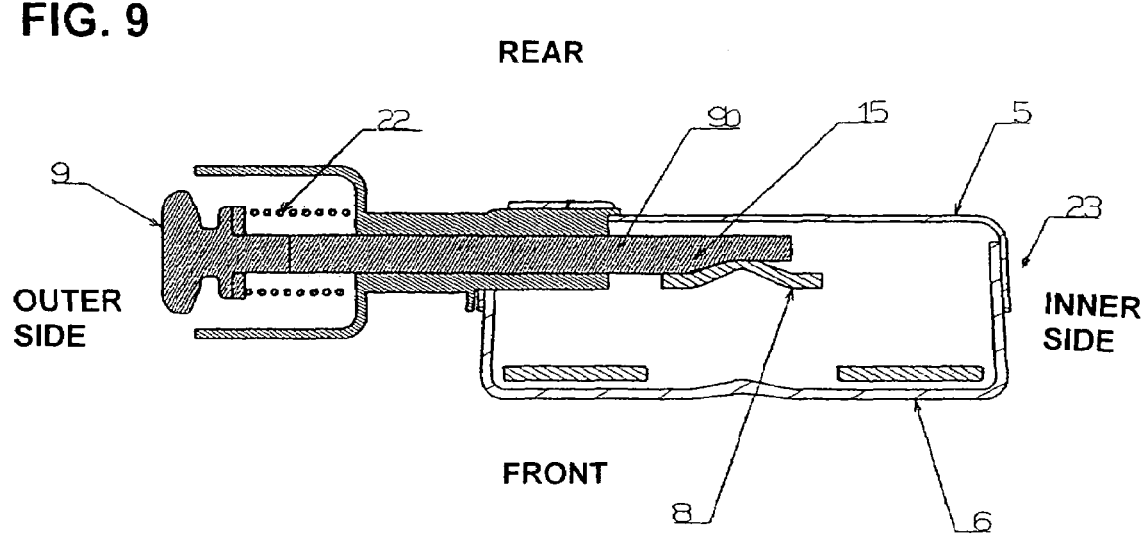
FIGS. 9 and 10 are top and bottom views, respectively, of the main portion of the control knob, which is a push-pull type, used in the headrest of the present invention, the control knob being provided on one side (outer side) of the headrest.

Next, the manner to retract the headrest A in a retracted position will be described, if, as shown in FIG. 4, the control knob 9 is pressed in forward, the latching panel 8 is pushed forward and the latching surface 13a thereof is separated from the protruding step 11 of the turn restricting bracket 3. When this is done, the preventative force restricting the forward turning of the headrest A is released, and as a result, as seen from FIG. 5, the headrest A can be turned forward to a prescribed position or angle (FIG. 5). This position of the headrest A is the retracted position, wherein the headrest A is toppled forward at a prescribed angle so that its height is reduced; and the visibility of the driver is opened up, and it will then be possible to fold up the seat more completely. When the headrest A comes to this retracted position, the turn restricting bracket 3 comes up against the front base member 6 so that further forward turning of the headrest A can no longer possible. Also, since there must also be no play in the control knob 9, the knob 9 is constantly pushed outward (leftward in FIG. 9) by a spring 22.

Figure 10:
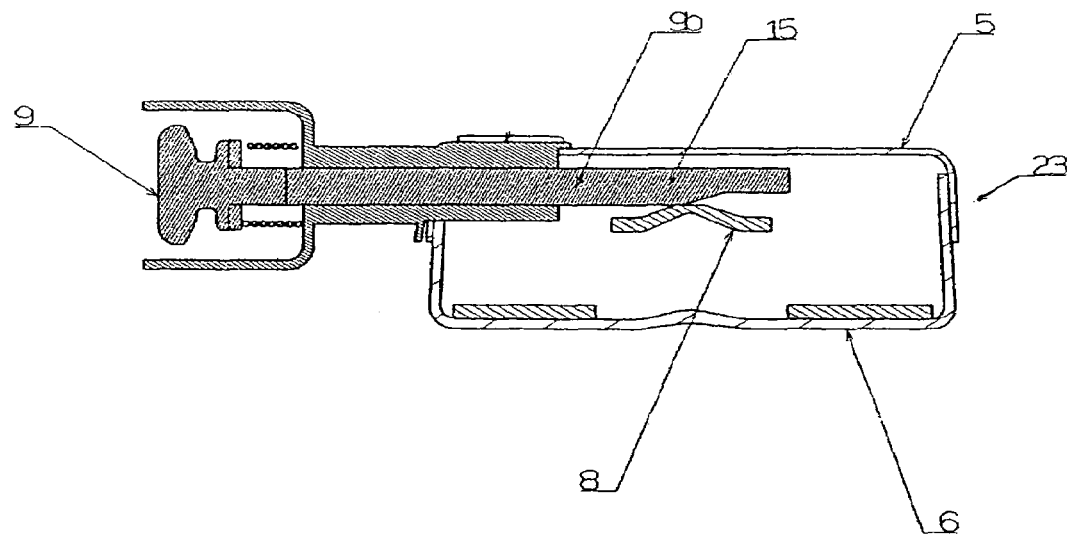

The control knob 9 described above is a push-pull type, and this is shown FIGS. 9 and 10, which are top views. In this shown example, a wedge 15 is formed in the knob shaft 9a of the control knob 9. When this control knob 9 is pushed in (FIG. 10), the wedge 15 causes the latching panel 8 to move forward (or toward the front base member 6) and withdraw the latching surface 13a of the latching panel 8 from the protruding step 11 of the turn restricting bracket 3; and when, as seen from FIG. 9, the control knob 9 is pulled back, the latching panel 8 is returned to its original position by the action of the spring 7.

Figure 11:
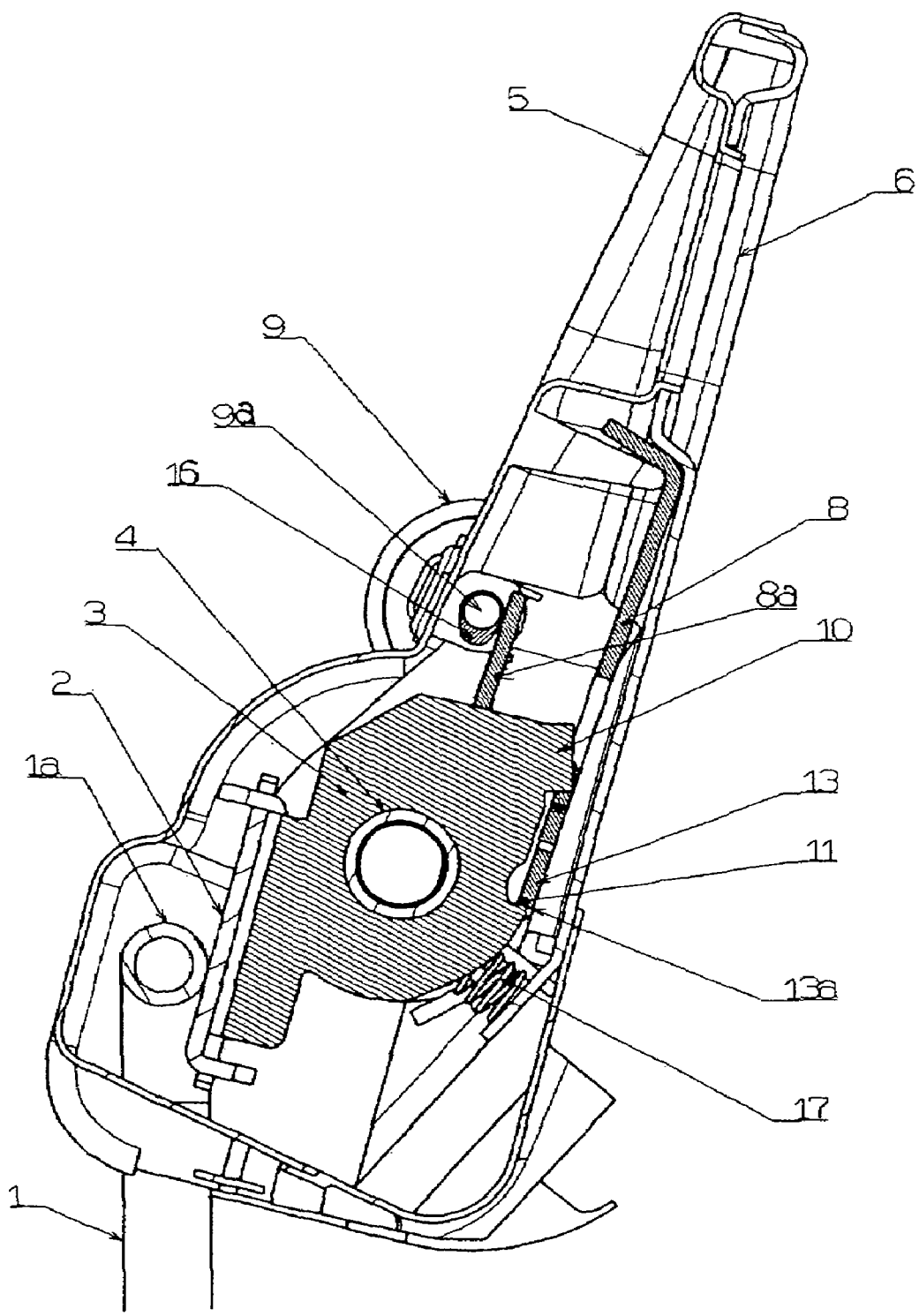
FIGS. 11 and 12 are side views of the main portion of a headrest in which the control knob is a rotary type.
Figure 12:
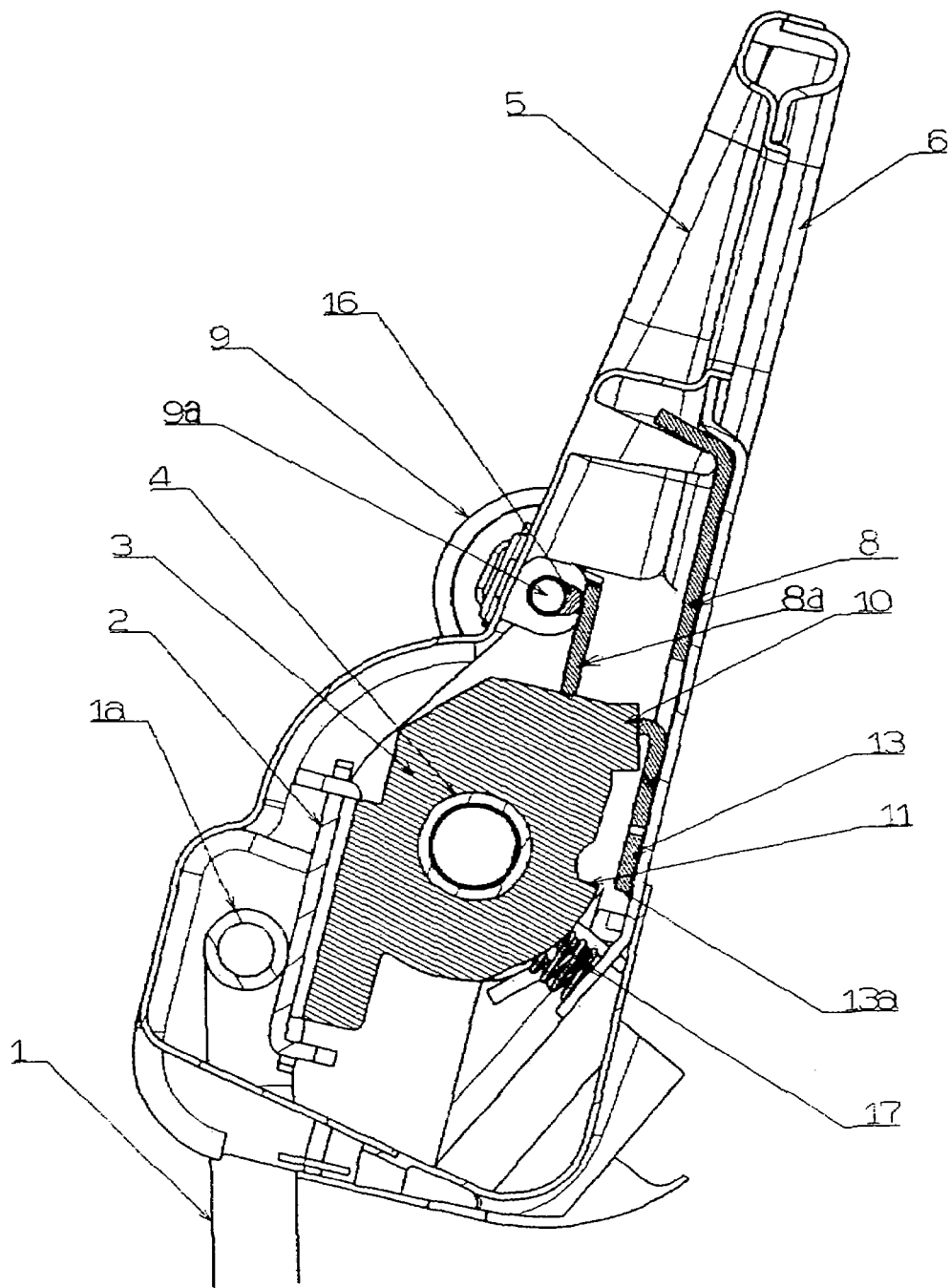

Alternatively, the control knob 9 can be a rotary type as shown in FIGS. 11 and 12 that are side views of the main portion of the rotary type knob 9. The knob 9 in this example is manipulated from the side surface of the headrest A; and an attachment 8a is provided on the side of the latching panel 8, and a cam 16 which acts on that attachment 8a is formed on the knob shaft 9a. When the control knob 9 is turned as prescribed angle, as seen from FIG. 12, the cam 16 pushes the attachment 8a (latching panel 8) forward and releases the latching surface 13a of the latching panel 8 from the protruding step 11 of the turn restricting bracket 3. When the control knob 9 is returned to its original position, as seen from FIG. 11, the latching panel 8 again latches in the protruding step 11 due to the action of a spring 17 (though a separate spring 17 is provided in this example as shown in FIG. 11, the return of the latching panel 8 can also be made by the spring 7 described above).

Figure 13:
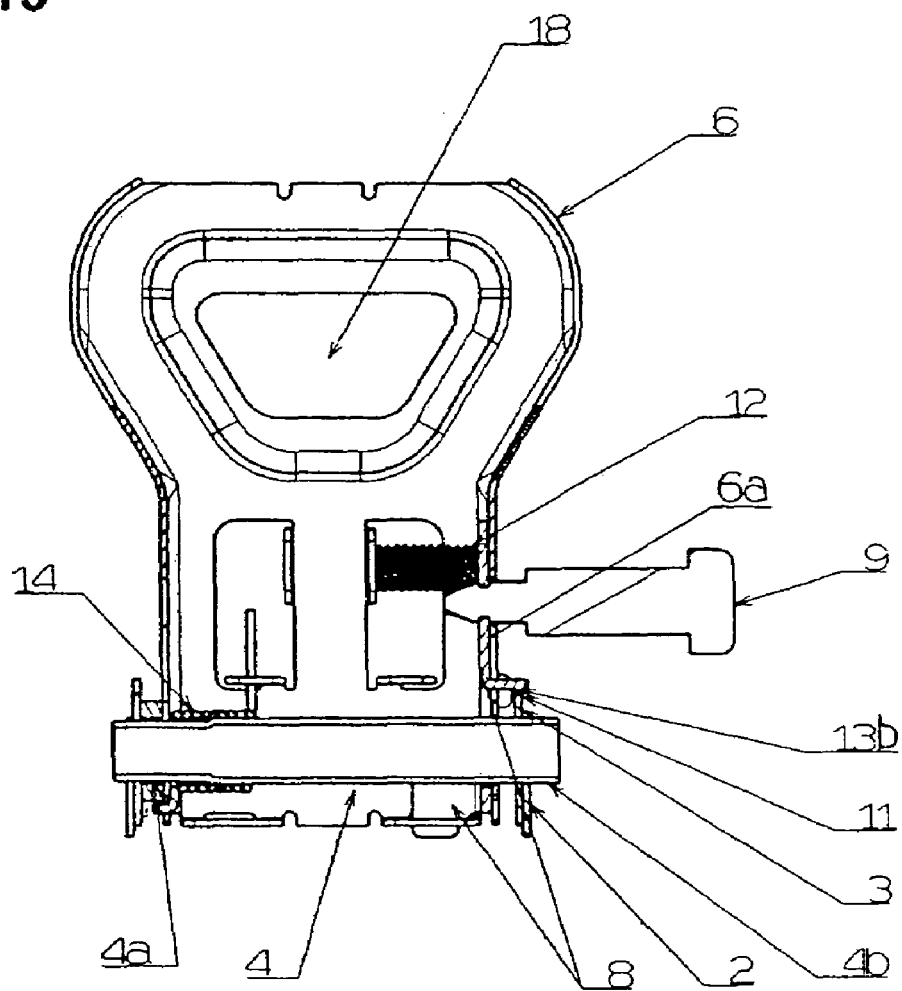
FIG. 13 is a front view of the main portion of another example of a headrest of the present invention.
Figure 14:
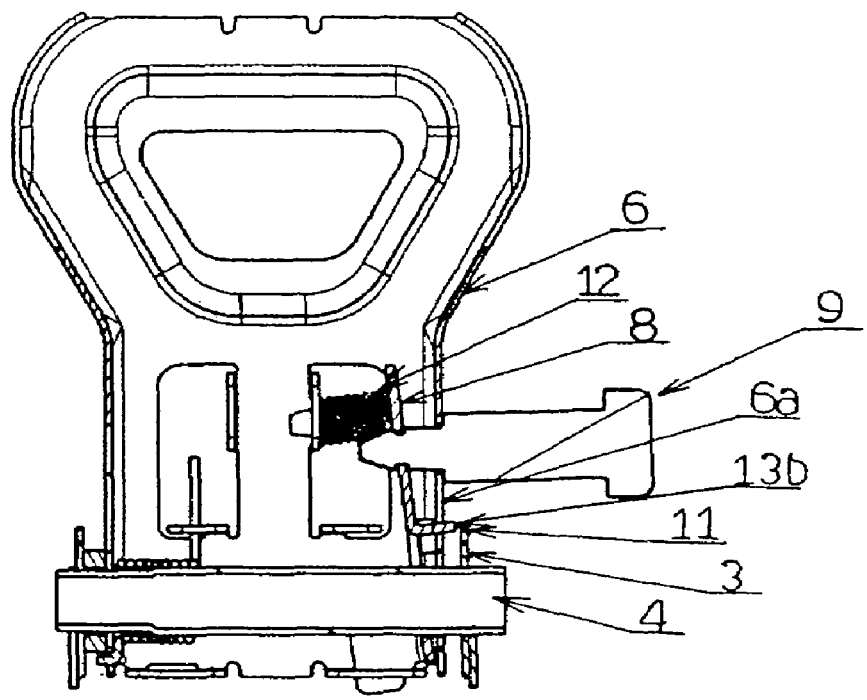
FIG. 14 is a front view of the main portion of another example of a headrest of the present invention.
Figure 15:
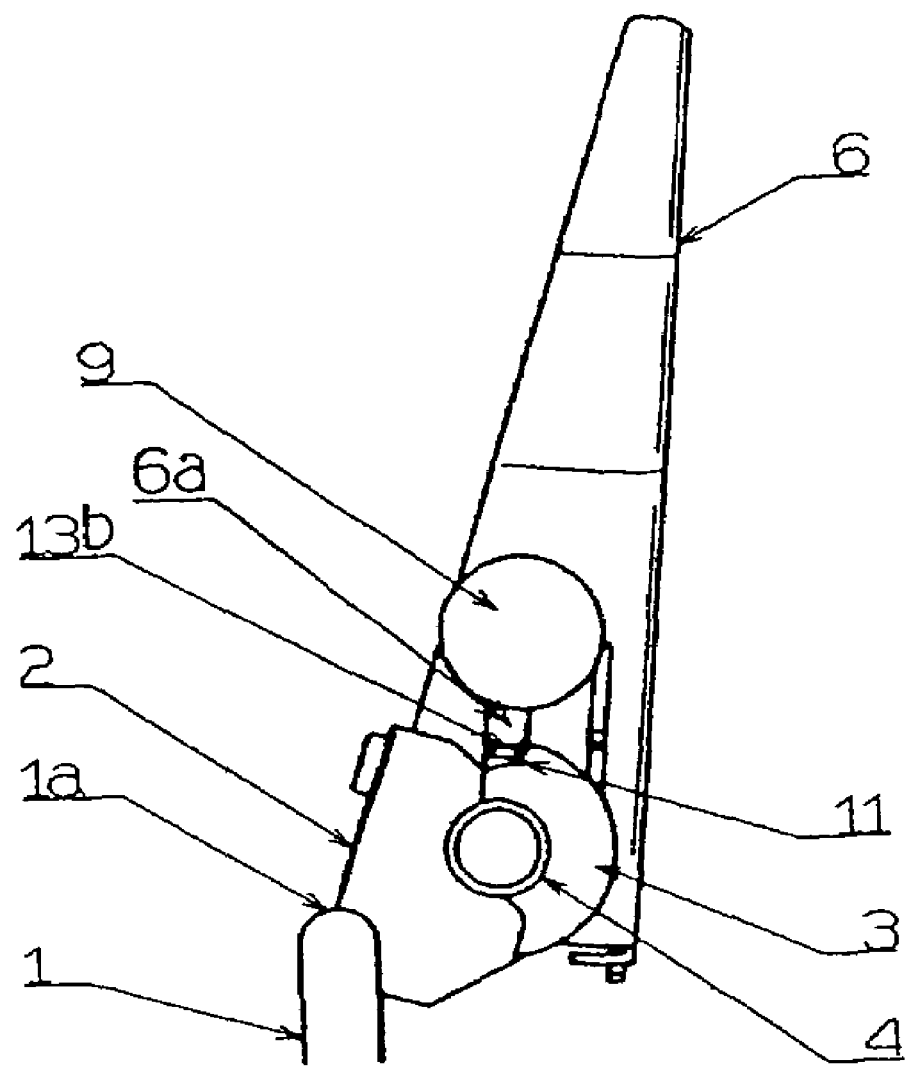
FIG. 15 is a side view of the main portion of another example of the headrest.

FIGS. 13 and 14, rear elevational views, show another example of the control knob 9, and FIG. 15 is a side view thereof. In this example, the latch 13 of the latching panel 8 is an outwardly facing pawl 13b formed only in one surface of the lower part thereof, and this latching panel 8 is designed so as to incline inwardly (the reference numeral 12 referring to a spring that pulls the latching panel 8 outwardly). Furthermore, the pawl 13b passes through a window 6a formed in the front base member 6 and latches to the protruding step 11 of the turn restricting bracket 3. In this structure, when the control knob 9 provided in the side surface of the front base member 6 is pushed, as shown in FIG. 14, the latching panel 8 is caused to incline inwardly, and the pawl 13b of the latching panel 8 is caused to be withdrawn from the protruding step 11 of the turn restricting bracket 3. As a result, the headrest A can be turned as far as to the retracted position. The latching force provided by the pawl 13b of the latching panel 8 in this example is weaker than in the example described earlier; however, the advantages here are that the structure is simple and the operation is easy.

Figure 16:
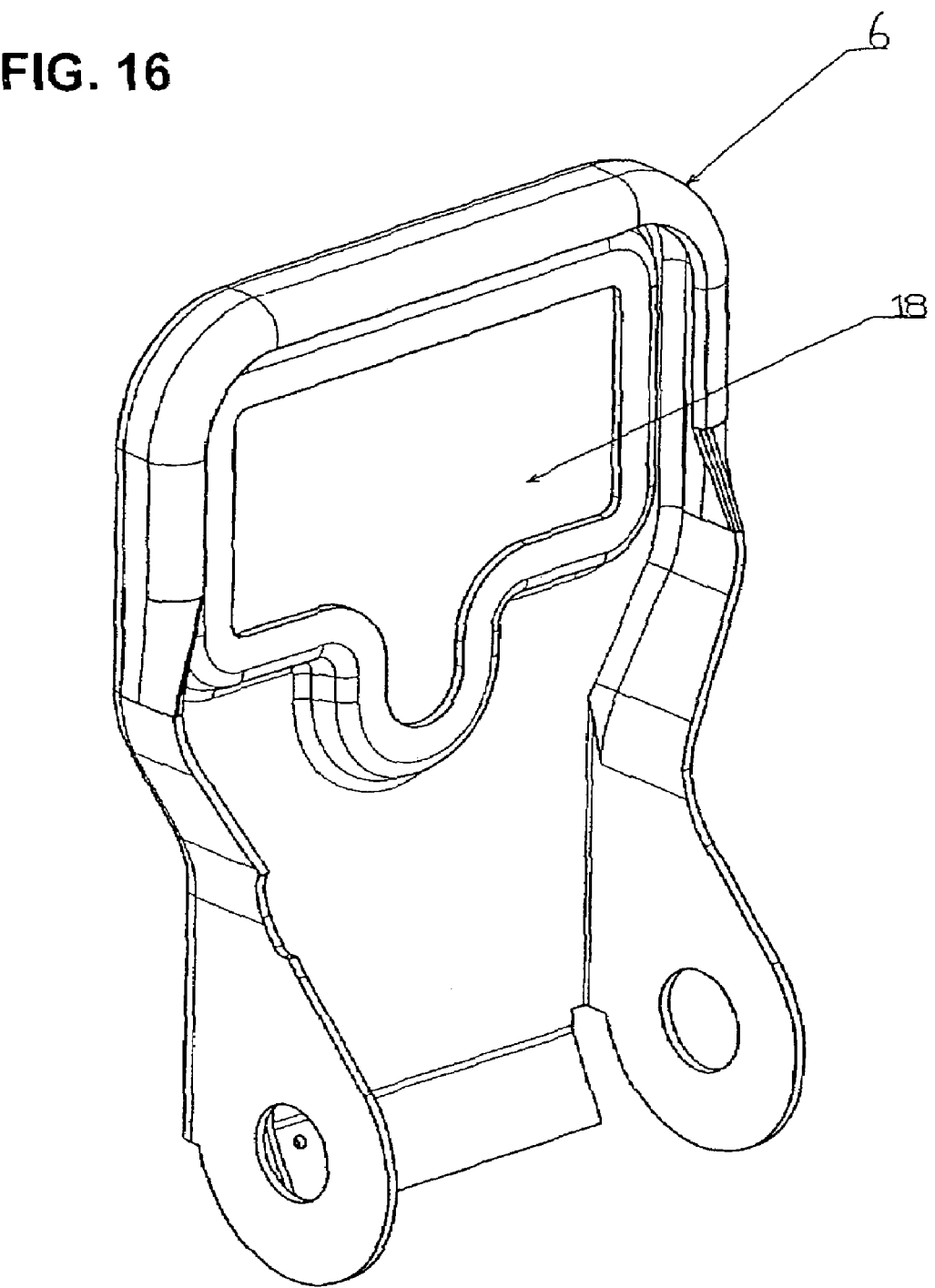
FIG. 16 is a perspective view of the base member used in the headrest of the present invention.

The front base member 6 noted earlier will be described below in more detail. This front base member 6 is a steel plate press-machined item, and it has a recess 18 formed in its middle portion, and in addition the cross-section thereof is substantially hook-shaped, with the peripheral corners rounded. Accordingly, since there will are no angular corners on the outer circumferential surface, it is safe in, for instance, a collision. As a consequence, because there is no need to cover the outside with a plastic cover, the structure of the front base member 6 contributes to material savings and cost reduction. The recess 18 of the front base member 6 makes urethane 21 fit better to the front base member 6 (see FIG. 2A) and contributes to cost reduction and lighter weight. The headrest A must exhibit a cushion-like quality; accordingly, the headrest of the present invention is based on the formation of urethane 21 foam. In this formation or process, the urethane 21 must not intrude into the main portion or into the area where the control knob 9 is provided, and it also must not restrict the movement of the headrest A when retracting of the headrest A is made. Accordingly, the rear plastic cover (rear base member) 5 and a lower forward plastic cover 19 are joined with sufficient material overlap 23 (see FIG. 2A and FIGS. 9 and 10) with respect to the front base member 6, and the shape is made such that there will be no interference with the seat back or the like when retracting the headrest A (see perspective view of FIG. 16). Covering of a surface skin 20 sewn in the form of a bag is made, and then urethane 21 in liquid form is injected therein and caused to foam, and, after that, the control knob 9 is built into.

The invention claimed is:

1. A headrest that is provided on a seat back and turns between an erect use position and a retracted position toppled forward, wherein
said headrest comprises:
a base material formed by a front base member and a rear base member,
a turn restricting bracket provided between said front and rear base members and formed with an abutting portion and a protruding step,
a center shaft attached laterally to the turn restricting bracket, and
a latching panel provided between said front and rear base members with one end thereof hinged to said rear base member, said latching panel being urged toward said rear base member; and wherein
said headrest is provided with
a forward use limitation position whereat, when the headrest turns forward about the center shaft and a latching surface formed in said latching panel catches on the protruding step of said turn restricting bracket, further forward turning of the headrest is restricted, and
a rearward use limitation position whereat, when the headrest turns rearward and the abutting portion of said turn restricting bracket strikes said front base member, further rearward turning of the headrest is restricted; and
a control knob is provided through said rear base member such that, when the latching surface of said latching panel is released from the protruding step of said turn restricting bracket by manipulation of said control knob, the headrest is able to turn forward to a retracted position.

2. The headrest according to claim 1, wherein a coil spring, in which an inner diameter thereof is smaller than an outer diameter of the center shaft and one end thereof is linked to said front base member, is wound on the center shaft so as to increase resistance to turning of said front base member, thus allowing a position of the headrest to be secured, against a load, even between the forward use limitation position and the rearward use limitation position.

3. The headrest according to claim 2, wherein the center shaft on which said coil spring is provided comprises different diameter portions in which one diameter portion making a larger diameter portion is larger in diameter than another diameter portion making a smaller diameter portion.

4. The headrest according to claim 2, wherein a coil spring linking part for said front base member is provided in said latching panel, so that, when said control knob is manipulated so as to release the latching surface of said latching panel from the protruding step of said turn restricting bracket, the coil spring linking part loosens said coil spring.

5. The headrest according to claim 2, wherein
the protruding step of said turn restricting bracket is formed such that a center shaft side thereof is formed as a higher inclined surface,
the latching surface of said latching panel is a rounded shape when viewed from a side thereof, and
the latching surface is pressed against the protruding step without play by an action of the coil spring provided on said center shaft.

6. The headrest according to claim 1, wherein each of said base members is a steel plate press-machined member bent at an upper part thereof around with a prescribed rounding so that a cross-section thereof is substantially hook-shaped, and said base member is recessed at a middle portion thereof.

7. The headrest according to claim 1, wherein a plastic cover is fitted from a lower part of said rear and front base members to front portions thereof, said base members and said plastic cover are covered by a surface skin made in a form of a bag, and urethane is injected therebetween and caused to foam.

8. The headrest according to claim 1, wherein said control knob is provided at a back or side of said headrest.

* * * * *